US007130172B2

(12) United States Patent
Inami et al.

(10) Patent No.: US 7,130,172 B2
(45) Date of Patent: Oct. 31, 2006

(54) SWITCHGEAR AND RECEIVING TRANSFORMATION APPARATUS USING THE SAME

(75) Inventors: Yoshiaki Inami, Hitachi (JP); Koichi Nakano, Tokai-mura (JP); Takashi Omori, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/125,243

(22) Filed: May 10, 2005

(65) Prior Publication Data

US 2005/0201028 A1 Sep. 15, 2005

Related U.S. Application Data

(63) Continuation of application No. 10/294,688, filed on Nov. 15, 2002, now abandoned.

(30) Foreign Application Priority Data

Dec. 12, 2001 (JP) ............................ 2001-378506

(51) Int. Cl.
*H02H 7/00* (2006.01)

(52) U.S. Cl. .......................................... 361/62; 361/64

(58) Field of Classification Search .................. 361/62, 361/64
See application file for complete search history.

(56) References Cited

U.S. PATENT DOCUMENTS 5,045,968 A 9/1991 Suzuyama et al. .......... 361/618
5,126,917 A * 6/1992 Matsuda ..................... 361/603
5,450,281 A 9/1995 Tanaka et al. .............. 361/611
5,559,669 A 9/1996 Inami et al. ................ 361/612
5,898,565 A 4/1999 Yamauchi et al. .......... 361/612
6,469,270 B1 10/2002 Omori et al. .................. 218/7
6,762,386 B1 7/2004 Itou et al. ...................... 218/43

FOREIGN PATENT DOCUMENTS

JP 6-74012 10/1994
JP 8-214425 8/1996
JP 9-28011 1/1997
JP 9-74620 3/1997
JP 11-355926 12/1999

* cited by examiner

*Primary Examiner*—Stephen W. Jackson
(74) *Attorney, Agent, or Firm*—Mattingly, Stanger, Malur & Brundidge, P.C.

(57) ABSTRACT

A switchgear having a primary circuit breaker and a secondary circuit breaker respectively arranged on the primary side and secondary side of a load switch or a voltage and current transformer for an instrument, a primary grounding switch arranged between the load switch or voltage and current transformer for an instrument and the primary circuit breaker, and a secondary grounding switch arranged between the load switch or voltage and current transformer for an instrument and the secondary circuit breaker, wherein to the primary and secondary circuit breakers and grounding switches, connection means are respectively connected so as to move the moving electrodes of the circuit breakers and grounding switches and an operation device for operating the moving electrodes in connection with each other via the connection bars is included and a receiving transformation apparatus using it.

10 Claims, 6 Drawing Sheets

SWITCHGEAR AND RECEIVING TRANSFORMATION APPARATUS USING THE SAME

This is a continuation application of U.S. Ser. No. 10/294, 688, filed Nov. 15, 2002.

BACKGROUND OF THE INVENTION

The present invention relates to a new switchgear and more particularly to a switchgear for a receiving transformation apparatus and a receiving transformation apparatus using it.

A device such as a load switch for breaking a load current or a trouble current requires periodic maintenance, so that particularly for a class of device not lower than a high-voltage system, a circuit breaker or disconnecting switch for separating from the circuit at the time of test or inspection and a grounding switch for grounding the separated part are generally installed.

When either the term "circuit breaker" or the term "circuit breakers" is used hereafter Applicants intend that these terms are also understood to mean "disconnecting switch" or "disconnecting switches", respectively, in accordance with their common usage in the relevant art.

FIG. 1 shows a single wire connection diagram of a switchgear composed of a load switch 1, a circuit breaker 2A, 2B, and a grounding switch 3A, 3B. In the prior art, the grounding switches on the primary and secondary sides of the load switch are used only at the time of inspection, so that as shown in FIG. 1, two grounding switches are mechanically connected and operated in connection with each other by one operation device.

In Japanese Utility Model Application Laid-open 6-74012, Japanese Patent Application Laid-Open No. Hei 08-214425, Japanese Patent Application Laid-Open No. Hei 09-28011, Japanese Patent Application Laid-Open No. Hei 09-74620, and Japanese Patent Application Laid-Open No. Hei 11-355926, a gas insulation switchgear that a circuit breaker operates in connection with a breaker is indicated.

SUMMARY OF THE INVENTION

When a switchgear is structured by the conventional method as shown in FIG. 1, three operation devices in total must be installed for the primary circuit breaker of the load switch, the secondary circuit breaker of the load switch, and the primary and secondary grounding switches of the load switch and a problem arises that the cost is increased. Further, in the primary and secondary grounding switches of the load switch, in order to prevent the circuit in the hot-line state from grounding by mistake, an interlock must be separately provided so that they cannot be operated unless the primary circuit breaker of the load switch and the secondary circuit breaker of the load switch are in an "Open" state. Also in the primary circuit breaker of the load switch and the secondary circuit breaker of the load switch, an interlock must be provided so that they cannot be operated unless the primary and secondary grounding switches of the load switch are in an "Open" state. Conventionally, in those devices, an electrical interlock is separately provided, resulting in complication of the system and increasing in the cost. Further, since an electrical interlock is used, in consideration of a case that the electrical interlock is not functioned as such at the time of loss of the control power of the system, there is a problem imposed in the reliability.

Further, in the aforementioned patent applications, although the circuit breakers and grounding switches are driven in connection with each other, a specific driving means for operating the primary and secondary circuit breakers and grounding switches by one operation means is not indicated.

The present invention is intended to provide a switchgear capable of connecting and surely switching primary and secondary circuit breakers and grounding switches and a receiving transformation apparatus using it.

Further, the present invention is intended to provide a switchgear capable of connecting and surely switching primary and secondary circuit breakers and grounding switches by one operation means and a receiving transformation apparatus using it.

Furthermore, the present invention is intended to provide a switchgear capable of connecting primary and secondary circuit breakers and grounding switches, providing a time difference between respective switching operations, and reducing the operation force and a receiving transformation apparatus using it.

The present invention is structured so as to connect four devices in total of primary and secondary circuit breakers and primary and secondary grounding switches of a load switch or a voltage and current transformer for an instrument by a mechanical connection means and operate them in connection with each other by one operation device. By doing this, the conventional three operation devices necessary for the circuit breakers and grounding switches are reduced to one device and the cost for two operation devices can be cut down. Further, the circuit breakers and grounding switches are mechanically connected and the circuit breakers and grounding switches are mechanically structured so as to prevent them from putting into a "closed" state at the same time, so that there is no need to separately provide an interlock between the circuit breakers and the grounding switches and the simplification of the system and the reliability of malfunction prevention can be enhanced. Further, sure switching can be executed in each operation.

The present invention relates to a switchgear having a primary circuit breaker and a secondary circuit breaker respectively arranged on the primary side and secondary side of a load switch or a voltage and current transformer for an instrument, a primary grounding switch arranged between the load switch or voltage and current transformer for an instrument and the primary circuit breaker, and a secondary grounding switch arranged between the load switch or voltage and current transformer for an instrument and the secondary circuit breaker, wherein the switchgear is mechanically structured so that the primary circuit breaker, secondary circuit breaker, primary grounding switch and secondary grounding switch are connected by a mechanical means, and they are connected to one operation device, and the four devices are all operated in connection with each other, and when the primary circuit breaker and secondary circuit breaker are in the "closed" state, the primary switch and secondary switch are in the "open" state, and when the primary grounding switch and secondary grounding switch are in the "closed" state, the primary circuit breaker and secondary circuit breaker are in the "open" state.

The switchgear is a one that for either one or both of the primary circuit breaker and grounding switch of the load switch or the voltage and current transformer for an instrument and the secondary circuit breaker and grounding switch of the load switch or the voltage and current transformer for an instrument, a three-position switch with circuit breakers and grounding switches integrated is adopted.

The present invention relates to a switchgear having a primary circuit breaker and a secondary circuit breaker respectively arranged on the primary side and secondary side of a load switch or a voltage and current transformer for an instrument, a primary grounding switch arranged between the load switch or voltage and current transformer for an instrument and the primary circuit breaker, and a secondary grounding switch arranged between the load switch or voltage and current transformer for an instrument and the secondary circuit breaker, wherein the switchgear has a drive structure for operating the primary and secondary circuit breakers and grounding switches in connection with each other, an operation device for driving the primary and secondary circuit breakers and grounding switches, and a driving device for driving the load switch or voltage and current transformer for an instrument independently of the operation device.

In a switchgear having a primary circuit breaker and a secondary circuit breaker respectively arranged on the primary side and secondary side of a load switch or a voltage and current transformer for an instrument, a primary grounding switch arranged between the load switch or voltage and current transformer for an instrument and the primary circuit breaker, and a secondary grounding switch arranged between the load switch or voltage and current transformer for an instrument and the secondary circuit breaker, to put the circuit breakers and grounding switches into an open or closed state which will be described later, to the primary and secondary circuit breakers and grounding switches, connection bars are respectively connected so as to move the moving electrodes of the circuit breakers and grounding switches and an operation device for operating the moving electrodes in connection with each other via the connection bars is provided.

Further, the switchgear of the present invention has a drive structure for operating the primary and secondary circuit breakers and grounding switches in connection with each other and adjusting the start or end time of the operation and an operation device for driving the primary and secondary circuit breakers and grounding switches.

Furthermore, the present invention relates to a switchgear having circuit breakers and grounding switches, which has drive levers connected to the moving electrodes of the circuit breakers and grounding switches for driving the moving electrodes, drive shafts for driving the drive levers, a first relay lever for rotating the drive shafts in the axial direction thereof, a link rod for driving the first relay lever, a second relay lever for driving the link rod in the length direction, a relay shaft for driving the second relay lever, and an operation device for rotating the relay shafts and has a drive structure for driving the moving electrodes of the circuit breakers and grounding switches in connection with each other by rotation of the relay shafts.

The present invention, in the same way as with the aforementioned, is a switchgear having a primary circuit breaker and a secondary circuit breaker respectively arranged on the primary side and secondary side of a load switch or a voltage and current transformer for an instrument, a primary grounding switch arranged between the load switch or voltage and current transformer for an instrument and the primary circuit breaker, and a secondary grounding switch arranged between the load switch or voltage and current transformer for an instrument and the secondary circuit breaker, wherein the switchgear has drive levers connected to the moving electrodes of the primary and secondary circuit breakers and primary and secondary grounding switches in the same way as with the aforementioned for driving the moving electrodes and a drive structure for driving the moving electrodes of the primary and secondary circuit breakers and primary and secondary grounding switches in connection with each other.

Further, the present invention relates to a switchgear having circuit breakers and grounding switches, which has a three-position switching means for driving the fixed electrodes of the circuit breakers and grounding switches so as to freely switch, a drive lever for driving the three-position switching means, a drive shaft for driving the drive lever, a first relay lever for rotating the drive shaft in the axial direction thereof, a first link rod for driving the first relay lever, a second relay lever for driving the first link rod in the length direction, a relay shaft for driving the second relay lever, a third relay lever for rotating the relay shaft, a second link rod for driving the third relay lever, and an operation device for driving the second link rod in the length direction and has a drive structure for driving the moving electrodes of the circuit breakers and grounding switches in connection with each other by driving of the second link rod.

Also in the present invention, a switchgear having a primary circuit breaker and a secondary circuit breaker respectively arranged on the primary side and secondary side of a load switch or a voltage and current transformer for an instrument, a primary grounding switch arranged between the load switch or voltage and current transformer for an instrument and the primary circuit breaker, and a secondary grounding switch arranged between the load switch or voltage and current transformer for an instrument and the secondary circuit breaker is the same as the aforementioned.

Furthermore, the present invention relates to a switchgear having circuit breakers and grounding switches, which has a three-position switching means for driving the fixed electrodes of the circuit breakers and grounding switches so as to freely switch, a drive lever for driving the three-position switching means, a drive shaft for driving the drive lever, and an operation lever for rotating the drive shaft in the axial direction thereof and has a drive structure for driving the moving electrodes of the circuit breakers and grounding switches in connection with each other by driving of the operation lever.

Further, the present invention, in the same way as with the aforementioned, is a switchgear having a primary circuit breaker and a secondary circuit breaker respectively arranged on the primary side and secondary side of a load switch or a voltage and current transformer for an instrument, a primary grounding switch arranged between the load switch or voltage and current transformer for an instrument and the primary circuit breaker, and a secondary grounding switch arranged between the load switch or voltage and current transformer for an instrument and the secondary circuit breaker.

The present invention relates to a switchgear which can be set in any state of (1) to (3) indicated below. These settings switch the primary and secondary circuit breakers and grounding switches at the same time.

(1) When the circuit breakers are in the "closed" state, the grounding switches are in the "open" state.

(2) When the circuit breakers are in the "open" state, the grounding switches are in the "open" state.

(3) When the circuit breakers are in the "open" state, the grounding switches are in the "closed" state.

Further, the primary and secondary circuit breakers or the primary and secondary grounding switches preferably make contact with each other or separate from each other with a time difference during switching.

The load switch or voltage and current transformer for an instrument of the present invention has a driving device for separating from the circuit and grounding at the time of test and inspection independently of the switching operation of the circuit breakers and grounding switches and by use of it, the operation time of the electrodes can be measured at the time of test and inspection.

DETAILED DESCRIPTION OF THE PREFERRED EMBODIMENTS

Embodiment 1

Figure 1:
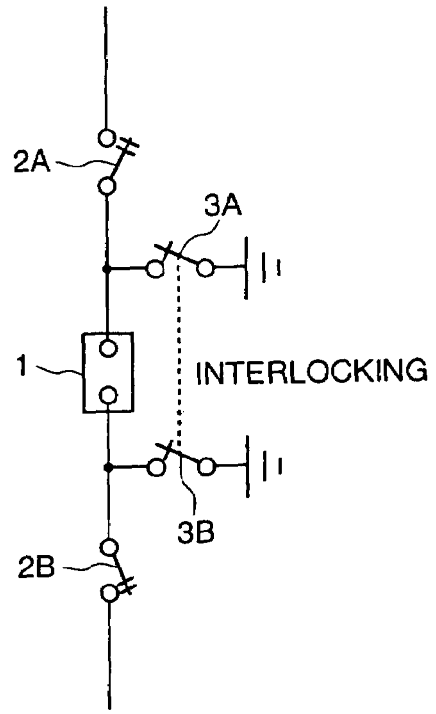
FIG. 1 is a circuit diagram showing a conventional single wire connection.
Figure 2:
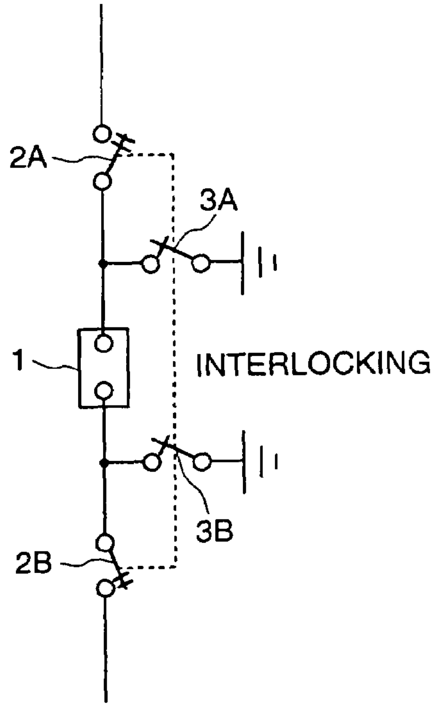
FIG. 2 is a circuit diagram showing the single wire connection of the present invention.
Figure 6:
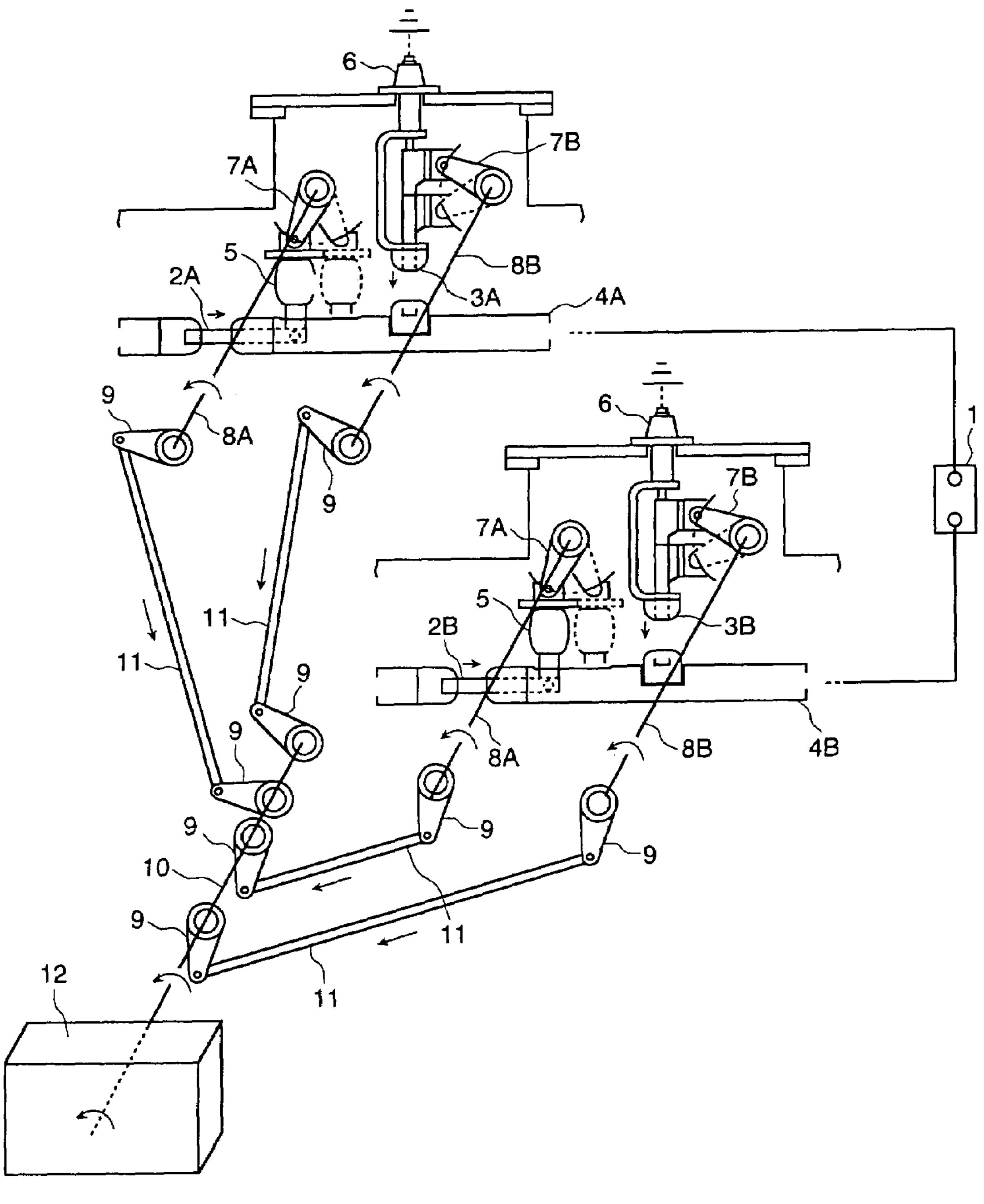
FIG. 6 is a schematic view of a switchgear structured on the basis of the single wire connection diagram shown in FIG. 2.

FIG. 6 is a schematic view of a switchgear having the operation device of the present invention structured on the basis of the single wire connection diagram shown in FIG. 2. On the primary side of a load switch 1, a circuit breaker 2A is installed via a connection conductor 4A and between the circuit breaker 2A and the load switch 1, a grounding switch 3A is installed. In the same way, on the secondary side of the load switch 1, a circuit breaker 2B is installed via a connection conductor 4B. The load switch 1 has a driving device for switching independently of switching of the circuit breakers 2A and 2B and the grounding switches 3A and 3B.

The electrode structure of the circuit breakers 2A and 2B and the grounding switches 3A and 3B is generally of a multi-band type or a tulip contact type, and the moving side thereof is in a bar shape, and the fixed side thereof is formed in a spring shape such as a multi-band or tulip shape and has a diameter smaller than that of the bar-shaped moving side, so that large force is required at the time of switching. Therefore, to perform a sure operation in switching, a mechanical connection means is necessary.

The respective circuit breakers 2A and 2B are switched by drive levers 7A via insulation operation rods 5. And, the respective grounding switches 3A and 3B are switched by drive levers 7B and can ground the circuits via grounding terminals 6.

The drive levers 7A and 7B of the circuit breakers and grounding switches are respectively connected to drive shafts 8A and 8B and the drive shafts 8A and 8B are respectively connected to a relay shaft 10 via relay levers 9 and link rods 11. To the relay shaft 10, an operation device 12 is connected and the circuit breakers 2A and 2B and the grounding switches 3A and 3B, 4 units in total, can be switched by one operation device 12.

The circuit breakers 2A and 2B and the grounding switches 3A and 3B are respectively connected to the relay shaft 10 when the former is in the "closed" state and the latter is in the "open" state, so that when the circuit breakers 2A and 2B are in the "closed" state, the grounding switches 3A and 3B will not be in the "closed" state.

Further, when the relay shaft 10 is rotated counterclockwise in this state, the circuit breakers 2A and 2B can be put into the "open" state and the grounding switches 3A and 3B can be put into the "closed" state. However, also in this case, when the grounding switches 3A and 3B are in the "closed" state, the circuit breakers 2A and 2B will not be in the "closed" state. Therefore, malfunctions such as grounding a circuit under charging or connecting a circuit under grounding to a circuit under charging will not be caused mechanically and interlocks separately provided so as to prevent these conventional malfunctions are not required. Therefore, a system which is simpler and more reliable can be operated.

Further, as mentioned above, the switching operation requires large operation force and the units are mechanically interlocked with each other, so that it is preferable to provide a slight time difference in operation between the circuit breakers 2A and 2B beforehand. This time difference enables intentionally shifting the contact time between the contacts of the circuit breakers 2A and 2B and reducing the operation force applied to the operation device 12. By doing this, the contact positions are made slightly different.

According to this embodiment, on the primary and secondary sides of a device such as a load switch, circuit breakers and grounding switches can be surely switched highly reliably in a brief structure. Furthermore, in a device such as a load switch, when a circuit breaker for separating from the circuit at the time of test or inspection and a grounding switch for grounding the separated part are required, there is no need to separately install an interlock mechanism in each switch, and in the primary and secondary circuit breakers or grounding switches, an operation with a contact time difference provided can be performed, thus the operation force can be reduced.

Embodiment 2

Figure 3:
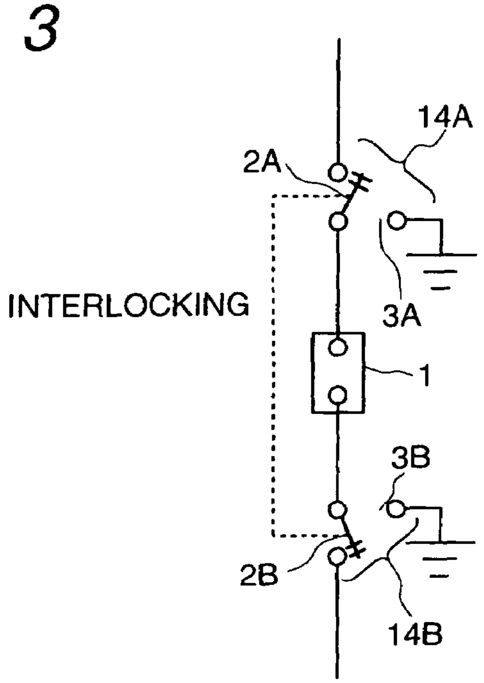
FIG. 3 is a circuit diagram showing a single wire connection when a three-position switch is applied to FIG. 2.

FIG. 3 shows a single wire connection diagram when a three-position switch is adopted to each of the circuit breaker 2A and grounding switch 3A on the primary side of the load switch 1 and the circuit breaker 2B and grounding switch 3B on the secondary side thereof in the embodiment shown in FIG. 2.

Figure 7:
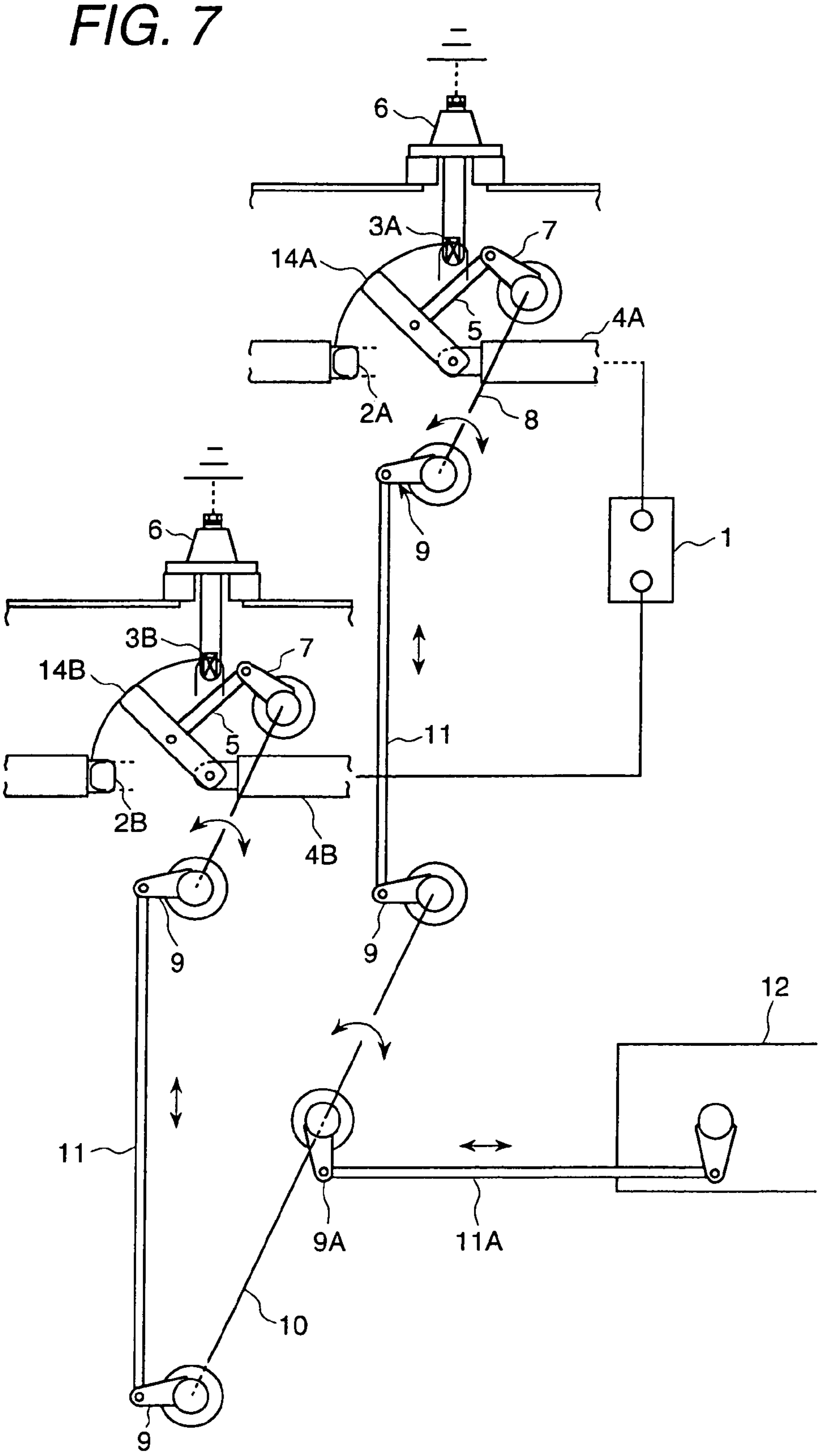
FIG. 7 is a schematic view of a switchgear structured on the basis of the single wire connection diagram shown in FIG. 3.

FIG. 7 is a schematic view of a switchgear showing an embodiment of the present invention structured on the basis of the single wire connection diagram shown in FIG. 3. On the primary side of the load switch 1, a three-position switch 14A composed of the circuit breaker 2A and the grounding switch 3A is installed so as to ground the side of the load switch 1. In the same way, on the secondary side of the load switch 1, a three-position switch 14B composed of the circuit breaker 2B and the grounding switch 3B is installed. Also in this embodiment, the load switch 1 has a driving device for switching independently of switching of the circuit breakers 2A and 2B and the grounding switches 3A and 3B.

The respective three-position switches 14A and 14B are operated by the drive levers 7 via the insulation operation rods 5, and when the drive levers are operated counterclockwise in the drawing, the circuit breakers 2A and 2B are "closed", and when they are operated clockwise, the grounding switches 3A and 3B are "closed". The drive levers 7 are respectively connected to the relay shaft 10 via the drive shafts 8, the relay levers 9, and the link rods 11. The relay shaft 10 is connected to the operation device 12 via the relay levers 9A and the link rod 11A, and the two three-position switches are operated by one operation device in connection with each other, thus the circuit breakers 2A and 2B and the grounding switches 3A and 3B can be operated in a batch.

The three-position switches 14A and 14B are respectively structured so as to prevent the circuit breakers and grounding switches from putting into the "closed" state at the same time and the drawing shows the circuit breakers 2A and 2B and the grounding switches 3A and 3B in the "open" state. When the relay shaft 10 is rotated counterclockwise in this state, the circuit breakers 2A and 2B are put into the "closed" state and the grounding switches 3A and 3B are put into the "open" state and when the relay shaft 10 is rotated clockwise, the circuit breakers 2A and 2B are put into the "open" state and the grounding switches 3A and 3B are put into the "closed" state. By use of this constitution, the circuit is not grounded by mistake, and no interlock device is necessary, and a switchgear which is simpler and more reliable can be provided.

The electrode structure of the circuit breakers 2A and 2B and the grounding switches 3A and 3B in this embodiment is of a knife-edge type that two laminar moving electrodes are formed in a two-way, and force is applied to the opposite side by a spring, and the electrodes are held by the fixed laminar electrodes and make contact and in the same way as with Embodiment 1, large force is required for switching. Therefore, in the same way, the length of the connection means can be adjusted so as to operate the circuit breakers 2A and 2B and the grounding switches 3A and 3B with a time difference provided.

According to this embodiment, on the primary and secondary sides of a device such as a load switch, circuit breakers and grounding switches can be surely switched highly reliably in a brief structure. Furthermore, in a device such as a load switch, when a circuit breaker for separating from the circuit at the time of test or inspection and a grounding switch for grounding the separated part are required, there is no need to separately install an interlock mechanism in each switch, and in the primary and secondary circuit breakers or grounding switches, an operation with a contact time difference provided can be performed, thus the operation force can be reduced.

Embodiment 3

Figure 4:
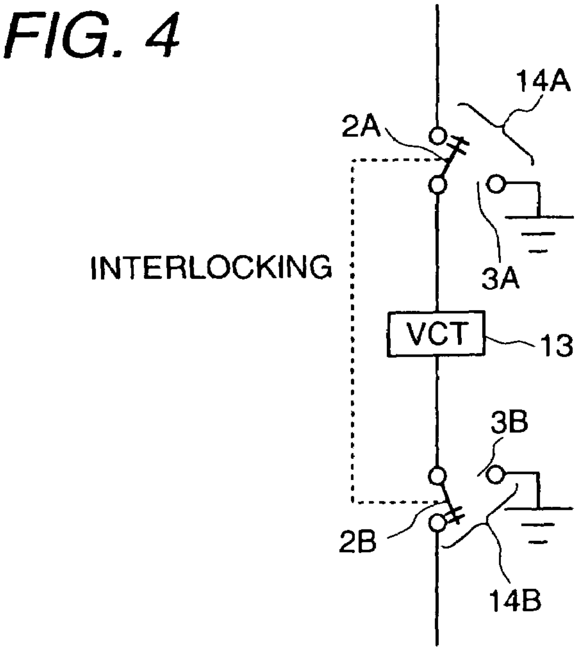
FIG. 4 is a circuit diagram showing a single wire connection when the load switch shown in FIG. 3 is substituted for a voltage and current transformer for an instrument.

FIG. 4 shows a single wire connection diagram when the load switch 1 is substituted for the voltage and current transformer 13 for an instrument in the embodiment shown in FIG. 3. As shown in the drawing, in a device requiring circuit breakers and grounding switches on the primary and secondary sides thereof for maintenance or test such as the voltage and current transformer for an instrument other than the load switch, by use of the present invention, a switchgear which is simpler, more low-priced and highly reliable can be structured.

Figure 8:
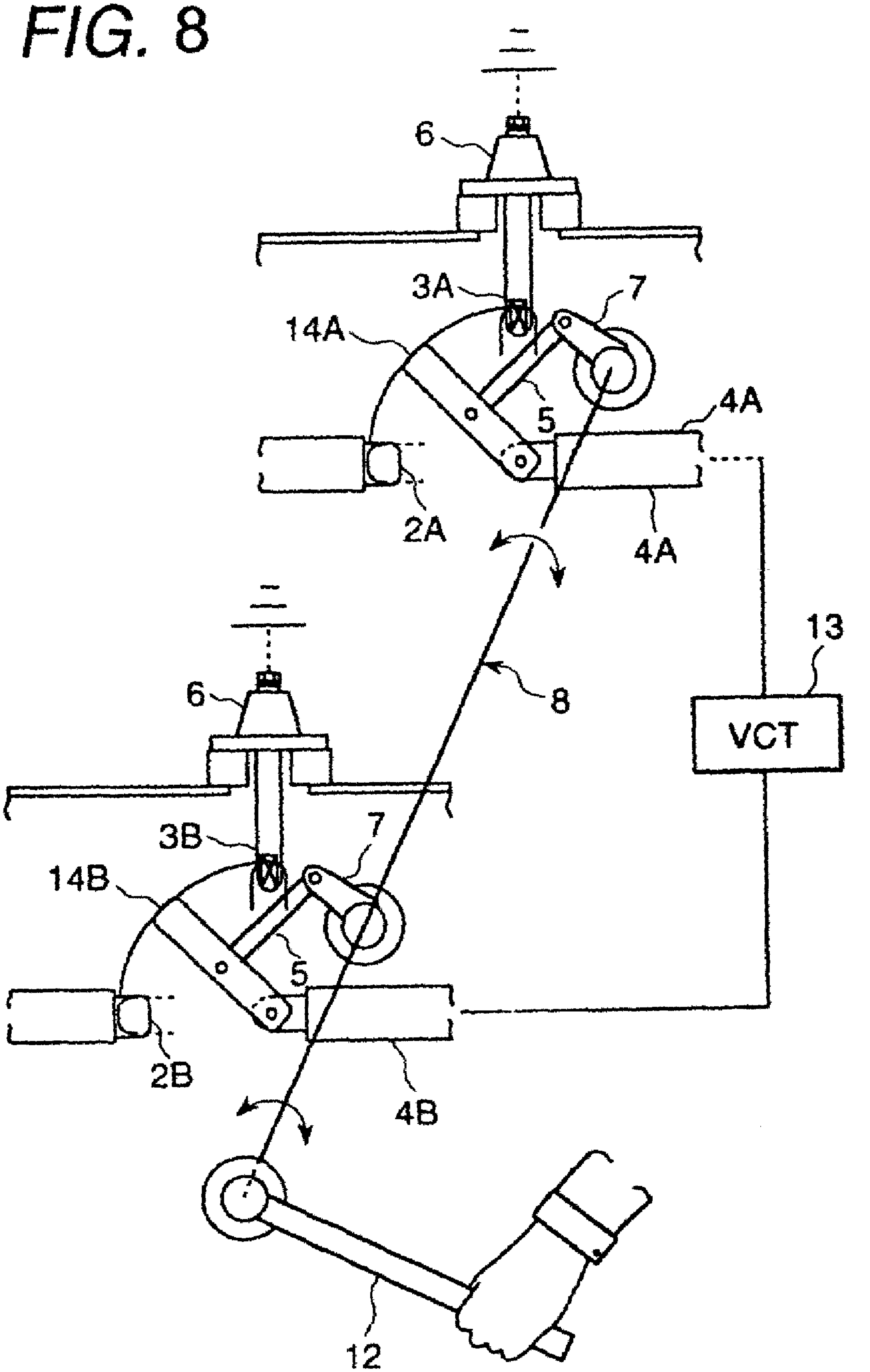
FIG. 8 is a schematic view of a switchgear structured on the basis of the single wire connection diagram shown in FIG. 4.

FIG. 8 shows an embodiment structured on the basis of the single wire connection diagram shown in FIG. 4. The switchgear has a constitution that on the primary and secondary sides of the voltage and current transformer for an instrument 13, in the same way as the case shown in FIG. 7, the three-position switches 14A and 14B are installed and the drive shaft 8 common to the three-position switches 14A and 14B is directly operated. Also in this embodiment, in the same way as with the case shown in FIG. 7, low cost, simplification, and high reliability can be expected. The voltage and current transformer for an instrument 13 is used to measure the electric energy.

Figure 5:
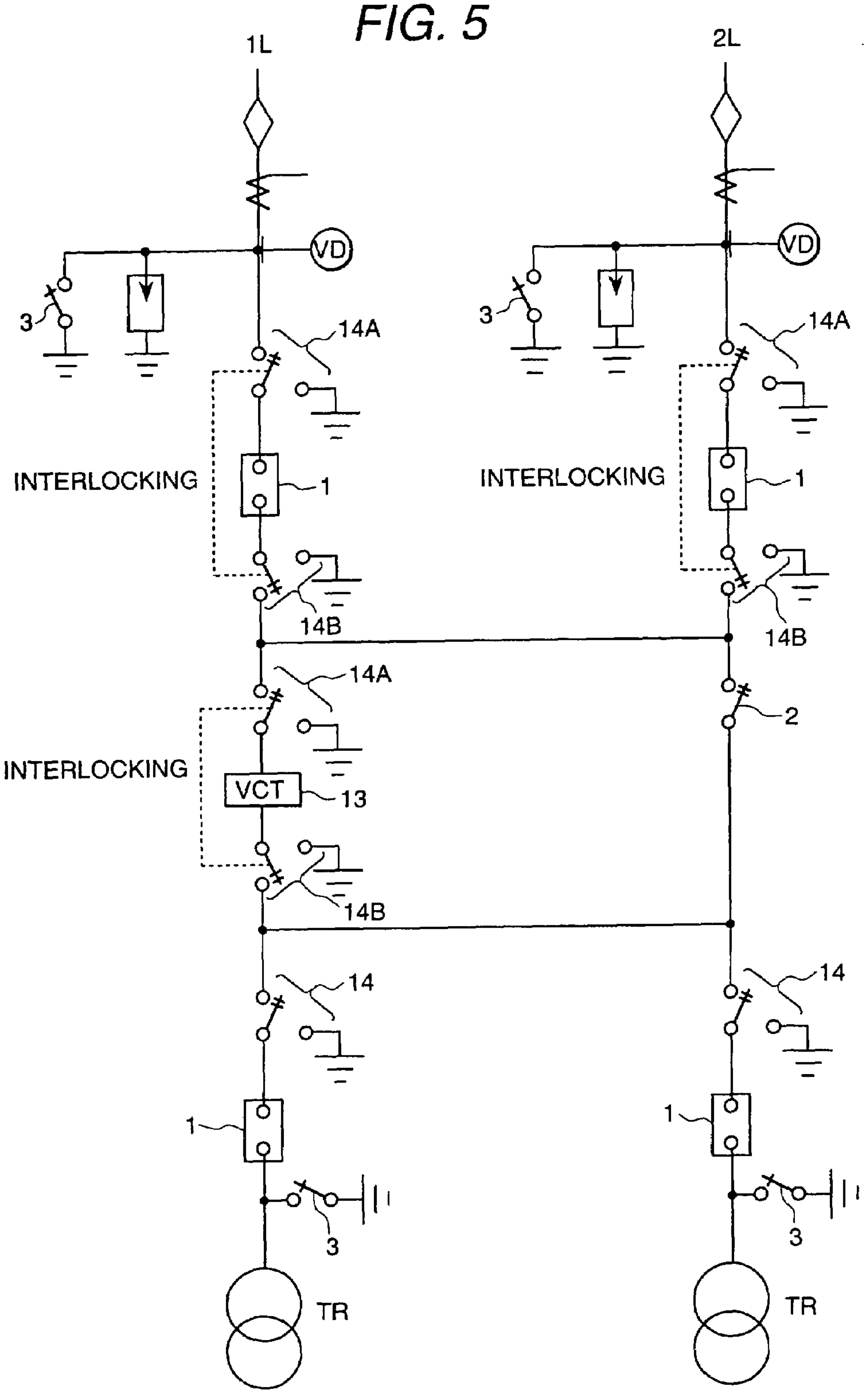
FIG. 5 is a circuit diagram showing a single wire connection showing a receiving transformation apparatus structured by applying the present invention.

FIG. 5 is a single wire connection diagram showing an example of a receiving transformation apparatus structured by using FIGS. 3 and 4 which is an embodiment of the present invention. By application of the present invention particularly in the field of receiving transformation apparatus as shown in this drawing, a switchgear which is low-priced and highly reliable can be supplied.

Also in this embodiment, the circuit breakers 2A and 2B and the grounding switches 3A and 3B can be operated with a time difference provided.

According to this embodiment, on the primary and secondary sides of a device such as a load switch, circuit breakers and grounding switches can be surely switched highly reliably in a brief structure. Furthermore, in a device such as a load switch, when a circuit breaker for separating from the circuit at the time of test or inspection and a grounding switch for grounding the separated part are required, there is no need to separately install an interlock mechanism in each switch, and in the primary and secondary circuit breakers or grounding switches, an operation with a contact time difference provided can be performed, thus the operation force can be reduced.

According to the present invention, a switchgear having circuit breakers and grounding switches respectively on the primary and secondary sides of a device such as a load switch can be provided highly reliably in a brief structure. Furthermore, according to the present invention, in a device such as a load switch, when a circuit breaker for separating from the circuit at the time of test or inspection and a grounding switch for grounding the separated part are required, there is no need to separately install an interlock mechanism in each switch, and in the primary and secondary circuit breakers or grounding switches, an operation with a contact time difference provided can be performed, thus a switchgear capable of reducing the operation force and a receiving transformation apparatus using it can be provided.

The invention claimed is:

1. A switchgear having a primary disconnecting switch and a secondary disconnecting switch respectively arranged on a primary side and a secondary side of a load switch or a voltage and current transformer for an instrument, a primary grounding switch arranged between said load switch or said voltage and current transformer for an instrument and said primary disconnecting switch, and a secondary grounding switch arranged between said load switch or said voltage and current transformer for an instrument and said secondary disconnecting switch, wherein to said primary and secondary disconnecting switches and grounding switches, connection means are respectively connected so as to move moving electrodes of said disconnecting switches and said grounding switches and said switchgear has an operation device for operating said moving electrodes in connection with each other via said connection means.

2. A switchgear having a primary disconnecting switch and a secondary disconnecting switch respectively arranged on a primary side and a secondary side of a load switch or a voltage and current transformer for an instrument, a primary grounding switch arranged between said load switch or said voltage and current transformer for an instrument and said primary disconnecting switch, and a secondary grounding switch arranged between said load switch or said voltage and current transformer for an instrument and said secondary disconnecting switch, further comprising a drive structure for operating said primary and secondary disconnecting switches and grounding switches in connection with each other, an operation device for driving said primary and secondary disconnecting switches and grounding switches, and a driving device for driving said load switch independently of said operation device.

3. A switchgear having a primary disconnecting switch and a secondary disconnecting switch respectively arranged on a primary side and a secondary side of a load switch or a voltage and current transformer for an instrument, a primary grounding switch arranged between said load switch or said voltage and current transformer for an instrument and said primary disconnecting switch, and a secondary grounding switch arranged between said load switch and said secondary disconnecting switch, wherein so that when said primary disconnecting switch and said secondary disconnecting switch are in a closed state, said primary switch and said secondary grounding switch are put into an open state, or when said primary grounding switch and said second grounding switch are in a closed state, said primary disconnecting switch and said secondary disconnecting switch are put into an open state, or when said primary disconnecting switch and said secondary disconnecting switch are in an open state, said primary grounding switch and said secondary grounding switch are put into an open state, to said primary and secondary disconnecting switches and grounding switches, connection means are respectively connected so as to move moving electrodes of said disconnecting switches and said grounding switches and said switchgear has an operation device for operating said moving electrodes in connection with each other via said connection means.

4. A switchgear having a primary disconnecting switch and a secondary disconnecting switch respectively arranged on a primary side and a secondary side of a load switch or a voltage and current transformer for an instrument, a primary grounding switch arranged between said load switch or said voltage and current transformer for an instrument and said primary disconnecting switch, and a secondary grounding switch arranged between said load switch and said secondary disconnecting switch, further comprising a drive structure for operating said primary and secondary disconnecting switches and grounding switches in connection with each other and adjusting a start or end time of said operation and an operation device for driving said primary and secondary disconnecting switches and grounding switches.

5. A switchgear having disconnecting switches and grounding switches, further comprising drive levers connected to moving electrodes of said disconnecting switches and said grounding switches for driving said moving electrodes, drive shafts for driving said drive levers, a first relay lever for rotating said drive shafts in an axial direction of said drive shafts, a link rod for driving said first relay lever, a second relay lever for driving said link rod in a length direction, a relay shaft for driving said second relay lever, and an operation device for rotating said relay shafts and comprising a drive structure for driving said moving electrodes of said disconnecting switches and said grounding switches in connection with each other by rotation of said relay shafts.

6. A switchgear having a primary disconnecting switch and a secondary disconnecting switch respectively arranged on a primary side and a secondary side of a load switch or a voltage and current transformer for an instrument, a primary grounding switch arranged between said load switch or said voltage and current transformer for an instrument and said primary disconnecting switch, and a secondary grounding switch arranged between said load switch and said secondary disconnecting switch, further comprising drive levers connected to moving electrodes of said primary and secondary disconnecting switches and said primary and secondary grounding switches for driving said moving electrodes, drive shafts for driving said drive levers, first relay levers for rotating said drive shafts in an axial direction of said drive shafts, link rods for driving said first relay levers, second relay levers for driving said link rods in a length direction, a relay shaft for driving said second relay levers, and an operation device for rotating said relay shaft and comprising a drive structure for driving said moving electrodes of said primary and secondary disconnecting switches and said primary and secondary grounding switches in connection with each other by rotation of said relay shaft.

7. A switchgear having disconnecting switches and grounding switches, comprising three-position switching means for driving fixed electrodes of said disconnecting switches and said grounding switches so as to freely switch, a drive lever for driving said three-position switching means, a drive shaft for driving said drive lever, a first relay lever for rotating said drive shaft in an axial direction of said drive shaft, a first link rod for driving said first relay lever, a second relay lever for driving said first link rod in a length direction, a relay shaft for driving said second relay lever, a third relay lever for rotating said relay shaft, a second link rod for driving said third relay lever, and an operation device for driving said second link rod in a length direction and comprising a drive structure for driving moving electrodes of said disconnecting switches and said grounding switches in connection with each other by driving of said second link rod.

8. A switchgear having a primary disconnecting switch and a secondary disconnecting switch respectively arranged on a primary side and a secondary side of a load switch or a voltage and current transformer for an instrument, a primary grounding switch arranged between said load switch or said voltage and current transformer for an instrument and said primary disconnecting switch, and a secondary grounding switch arranged between said load switch or said voltage and current transformer for an instrument and said secondary disconnecting switch, comprising three-position switching means for driving fixed electrodes of said primary and secondary disconnecting switches and said primary and secondary grounding switches so as to freely switch, a drive lever for driving said three-position switching means, a drive shaft for driving said drive lever, a first relay lever for rotating said drive shaft in an axial direction of said drive shaft, a first link rod for driving said first relay lever, a second relay lever for driving said first link rod in a length direction, a relay shaft for driving said second relay lever, a third relay lever for rotating said relay shaft, a second link rod for driving said third relay lever, and an operation device for driving said second link rod in a length direction and comprising a drive structure for driving moving electrodes of said primary and secondary disconnecting switches and said primary and secondary grounding switches in connection with each other by driving of said second link rod.

9. A switchgear having disconnecting switches and grounding switches, comprising three-position switching means for driving fixed electrodes of said disconnecting switches and said grounding switches so as to freely switch, a drive lever for driving said three-position switching means, a drive shaft for driving said drive lever, and an operation lever for rotating said drive shaft in an axial direction of said drive shaft and comprising a drive structure for driving moving electrodes of said disconnecting switches and said grounding switches in connection with each other by driving of said operation lever.

10. A switchgear having a primary disconnecting switch and a secondary disconnecting switch respectively arranged on a primary side and a secondary side of a load switch or a voltage and current transformer for an instrument, a primary grounding switch arranged between said load switch or said voltage and current transformer for an instrument and said primary disconnecting switch, and a secondary grounding switch arranged between said load switch or said voltage and current transformer for an instrument and said secondary disconnecting switch, comprising three-position switching means for driving fixed electrodes of said primary and secondary disconnecting switches and said primary and secondary grounding switches so as to freely switch, a drive lever for driving said three-position switching means, a drive shaft for driving said drive lever, and an operation lever for rotating said drive shaft in an axial direction of said drive shaft and comprising a drive structure for driving moving electrodes of said primary and secondary disconnecting switches and said primary and secondary grounding switches in connection with each other by driving of said operation lever.

* * * * *